US009426228B2

(12) United States Patent
Kneckt et al.

(10) Patent No.: US 9,426,228 B2
(45) Date of Patent: Aug. 23, 2016

(54) CROSS LAYER SERVICE DISCOVERY FOR WIRELESS NETWORKS

(75) Inventors: Jarkko Kneckt, Espoo (FI); Mika Kasslin, Espoo (FI); Janne Marin, Espoo (FI)

(73) Assignee: Nokia Technologies Oy, Espoo (FI)

(*) Notice: Subject to any disclaimer, the term of this patent is extended or adjusted under 35 U.S.C. 154(b) by 382 days.

(21) Appl. No.: 13/128,607

(22) PCT Filed: Nov. 10, 2008

(86) PCT No.: PCT/IB2008/054708
§ 371 (c)(1),
(2), (4) Date: May 10, 2011

(87) PCT Pub. No.: WO2010/052523
PCT Pub. Date: May 14, 2010

(65) Prior Publication Data
US 2011/0216753 A1 Sep. 8, 2011

(51) Int. Cl.
*H04W 4/00* (2009.01)
*H04L 29/08* (2006.01)
*H04L 12/721* (2013.01)
*H04W 4/02* (2009.01)
*H04L 12/26* (2006.01)
*H04W 8/00* (2009.01)
*H04W 40/12* (2009.01)

(52) U.S. Cl.
CPC .............. *H04L 67/16* (2013.01); *H04L 45/70* (2013.01); *H04L 67/18* (2013.01); *H04W 4/02* (2013.01); *H04L 43/0811* (2013.01); *H04W 8/005* (2013.01); *H04W 40/12* (2013.01)

(58) Field of Classification Search
CPC ..... H04L 45/70; H04L 43/0811; H04L 67/18
USPC .................................... 370/252, 338
See application file for complete search history.

(56) References Cited

U.S. PATENT DOCUMENTS 5,535,195 A * 7/1996 Lee .............................. 370/256
8,107,457 B2 * 1/2012 White et al. .................. 370/350
8,305,897 B2 * 11/2012 Zhang et al. ................. 370/235

(Continued)

OTHER PUBLICATIONS

Shah et al., "Pedictive Location-Based QoS Routing in Mobile Ad Hoc", IEEE International Conference on Communication, vol. 2, 2002, pp. 1-21.

(Continued)

*Primary Examiner* — Khaled Kassim
*Assistant Examiner* — Syed S Ali
(74) *Attorney, Agent, or Firm* — Locke Lord LLP

(57) ABSTRACT

Service discovery for services on a wireless network is presented. It is determined (e.g., from a received Layer 2 message) that an offering apparatus h made a service available to entities joined to a wireless network. Then in a message, that is available to entities not joined to the network, is placed information about the services and also at least one of location information about the offering apparatus and link metric information about a network path to the offering apparatus. A discovering apparatus reads one or more transmitted messages (from different apparatuses in the same network in different networks), sees the service it wants is available through both, compares the different locations and/or the different link metrics, and based on the comparing chooses which network to join, or with which apparatus on the single network to create a peer link.

18 Claims, 6 Drawing Sheets

(56) References Cited

U.S. PATENT DOCUMENTS

| | | | |
|---|---|---|---|
| 2002/0184304 A1* | 12/2002 | Meade, II | G01S 5/02 709/203 |
| 2004/0066759 A1 | 4/2004 | Molteni et al. | |
| 2004/0110497 A1* | 6/2004 | Little | G06F 17/3089 455/418 |
| 2004/0202120 A1* | 10/2004 | Hanson | 370/328 |
| 2005/0111375 A1* | 5/2005 | Ravindran et al. | 370/252 |
| 2006/0176834 A1* | 8/2006 | Dickerson et al. | 370/260 |
| 2007/0264991 A1* | 11/2007 | Jones et al. | 455/420 |
| 2008/0002610 A1* | 1/2008 | Zheng | H04L 45/00 370/328 |
| 2008/0151796 A1 | 6/2008 | Jokela | |
| 2008/0232258 A1* | 9/2008 | Larsson et al. | 370/238 |
| 2008/0285544 A1* | 11/2008 | Qiu | H04L 29/12311 370/352 |
| 2008/0311944 A1* | 12/2008 | Hansen | G01S 1/02 455/517 |
| 2009/0299788 A1* | 12/2009 | Huber | G06Q 20/1235 455/456.3 |
| 2009/0319348 A1* | 12/2009 | Khosravy | G01C 21/20 705/14.1 |
| 2010/0049846 A1* | 2/2010 | Ballette et al. | 709/224 |
| 2010/0074130 A1* | 3/2010 | Bertrand et al. | 370/252 |
| 2010/0091669 A1* | 4/2010 | Liu et al. | 370/252 |
| 2010/0118727 A1* | 5/2010 | Draves et al. | 370/252 |
| 2010/0121941 A1* | 5/2010 | Harrang | H04L 12/00 709/219 |
| 2012/0163231 A1* | 6/2012 | Bertrand et al. | 370/252 |

OTHER PUBLICATIONS

"Draft Amendment to Standard for Information Technology—Telecommunications and information exchange between system-Local and metropolitan area networks-Specific requirements", Part 11: Wireless LAN Medium Access Control (MAC) and Physical Layer (PHY) specifications: Amendment 7: Interworking with External Networks, IEEE P802.11u™/D4.0, Sep. 2008, 169 pages.

International Search Report and Written Opinion received for corresponding Patent Cooperation Treaty Application No. PCT/IB2008/054708, dated Nov. 20, 2009, 17 pages.

Sud et al., "Enabling Rapid Wireless System Composition Through Layer-2 Discovery", IEEE Network, vol. 22, Issue: 4, Jul.-Aug. 2008, pp. 14-20.

Yang et al., "A Location-Based Service Advertisement Algorithm for Pervasive Service Discovery in Wireless Mobile Networks", Wireless Communications & Mobile Computing, vol. 9, Issue 6, Jun. 2009, pp. 845-858.

Camp et al., "Location Information Services in Mobile Ad Hoc Network", IEEE International Conference on Communication, vol. 5, 2002, pp. 3318-3324.

Krebs et al., "A Unified Service Discovery Architecture for Wireless Mesh Networks", Proceedings of the 7th International IFIP-TC6 Networking Conference on AdHoc and sensor networks, Wireless networks, Next generation internet, May 5-9, 2008, pp. 865-876.

Ergin, "A Cross Layer Protocol for Service Access in Mobile Ad Hoc Networks", 2003, 140 pages.

Ververidis et al., "Routing Layer Support for Service Discovery in Mobile Ad Hoc Networks", Proceedings of the Third IEEE International Conference on Pervasive Computing and Communications Workshops, Mar. 8-12, 2005, pp. 258-262.

Meshkova et al., "A Survey on Resource Discovery Mechanisms, Peer-To-Peer and Service Discovery Frameworks", Computer Networks: The International Journal of Computer and Telecommunications Networking, vol. 52, Issue 11, Aug. 2008, pp. 2097-2128.

Office action received for corresponding European Patent Application No. 08875857.8, dated Mar. 6, 2012, 5 pages.

"Radio Specification", Wibree Confidential, v04, Release 05, Mar. 2007, pp. 1-88.

* cited by examiner

CROSS LAYER SERVICE DISCOVERY FOR WIRELESS NETWORKS

RELATED APPLICATION

This application was originally filed as PCT Application No. PCT/IB2008/054708 filed Nov. 10, 2008.

TECHNICAL FIELD

The present application relates generally to wireless communication systems, methods, devices and computer programs and, more specifically, relate to service discovery such as in ad-hoc or point-to-point (infrastructure) networks, such as for example WLAN and WiFi networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AP access point
DNS domain name system
DNS-SD DNS service discovery
DTIM delivery traffic identification message
GAS generic advertisement service
GASTIM generic advertisement service traffic indication message
IBSS independent basic service set
IEEE Institute of Electrical and Electronics Engineers
IE information element
L2 layer 2
L3 layer 3
L2SD layer 2 service discovery
MAC medium access control layer
MLME MAC layer management entity
MP mesh point
PHY physical layer
SSDP simple service discovery protocol
SAP service access point
STA station
UPnP universal plug and lay
WFA WiFi Alliance
WLAN wireless local area network A device in communication network uses service discovery to get information of the offered services in another device or network. Service discovery in WLAN networks may be done at layer 3 (L3) and above. It may be based on the GAS procedure and relying on the protocols which run on top of the IP layer. The most widely used service discovery protocols are the ones specified in UPnP and Zeroconf (Zero Configuration Networking): namely SSDP and DNS-SD. Use of these protocols requires the client device to connect to the WLAN network and configure its IP layer, which is both time and power consuming. This has resulted in proposals to allow service discovery before network selection, which requires service information to be available at the WLAN MAC level, i.e. at layer 2 [thus the terminology Layer 2 service discovery (L2SD)]. STA may initiate service discovery by sending a GAS initial request frame. The STA may send the GAS initial request frame because the service information is not included in the beacon or probe response(s). Thus, the STA needs to complete a message exchange sequence to obtain the service information. In beacon and probe responses, an AP can inform a STA as to whether or not the AP supports GAS.

These teachings specify particulars of exemplary implementation mechanisms for L2SD.

SUMMARY

In one exemplary embodiment of this invention there is provided a method that includes determining that an offering apparatus has made a service available to entities joined to a mesh or ad-hoc network; and placing in a message, that is available to non-peer entities not joined to the network, information about the services and at least one of: location information about the offering apparatus; and link metric information about a path through the network to the offering apparatus.

In another exemplary embodiment of this invention there is provided a memory storing a program of computer-readable instructions executable by a processor to perform actions that include determining that an offering apparatus has made a service available to entities joined to a mesh or ad-hoc network; and placing in a message, that is available to non-peer entities not joined to the network, information about the services and at least one of: location information about the offering apparatus; and link metric information about a path through the network to the offering apparatus.

In still another exemplary embodiment of this invention there is provided an apparatus that includes a processor and a management entity. The processor is configured to determine that an offering apparatus has made a service available to entities joined to a mesh or ad-hoc network. The management entity is configured to place in a message that is available to non-peer entities not joined to the network information about the services and at least one of: location information about the offering apparatus; and link metric information about a path through the network to the offering apparatus.

In yet another exemplary embodiment of this invention there is provided an apparatus that includes processing means (e.g. a processor) for determining that an offering apparatus has made a service available to entities joined to wireless network like a mesh or ad-hoc network; and management means (the MLME-SAP detailed below) for placing in a message that is available to non-peer entities not joined to the wireless network information about the services and at least one of: location information about the offering apparatus; and link metric information about a path through the network to the offering apparatus.

In a further exemplary embodiment of this invention there is provided a method that includes comparing at least one of: location information about a first offering apparatus to location information about a second offering apparatus, and link metric information about a first network path to the first offering apparatus to link metric information about a second network path to the second offering apparatus. Further in the method a wireless network is joined and a peer link is created to an apparatus on the wireless network based on the comparing.

In a yet further exemplary embodiment of this invention there is provided a memory storing a program of computer-readable instructions executable by a processor to perform actions that include comparing at least one of: location information about a first offering apparatus to location information about a second offering apparatus, and link metric information about a first network path to the first offering apparatus to link metric information about a second network path to the second offering apparatus. The actions further include joining a wireless network like a mesh or ad-hoc network and creating a peer link to an apparatus on the network based on the comparing.

In still a further exemplary embodiment of this invention there is provided an apparatus that includes a processor and a transceiver. The processor that is configured to compare at least one of: location information about a first offering apparatus to location information about a second offering apparatus, and link metric information about a first network path to the first offering apparatus to link metric information about a second network path to the second offering apparatus. The transceiver is configured to join a mesh or ad-hoc network and create a peer link to an apparatus on the network based on the comparing.

In a further exemplary embodiment of this invention there is provided an apparatus that includes processing means (e.g., a processor) for comparing at least one of: location information about a first offering apparatus to location information about a second offering apparatus, and link metric information about a first network path to the first offering apparatus to link metric information about a second network path to the second offering apparatus. The apparatus further includes communication means (e.g., a transmitter or a transceiver) for joining a mesh or ad-hoc network and for creating a peer link to an apparatus on the network based on the comparing.

These and other exemplary embodiments are detailed further below.

DETAILED DESCRIPTION

Figure 1:
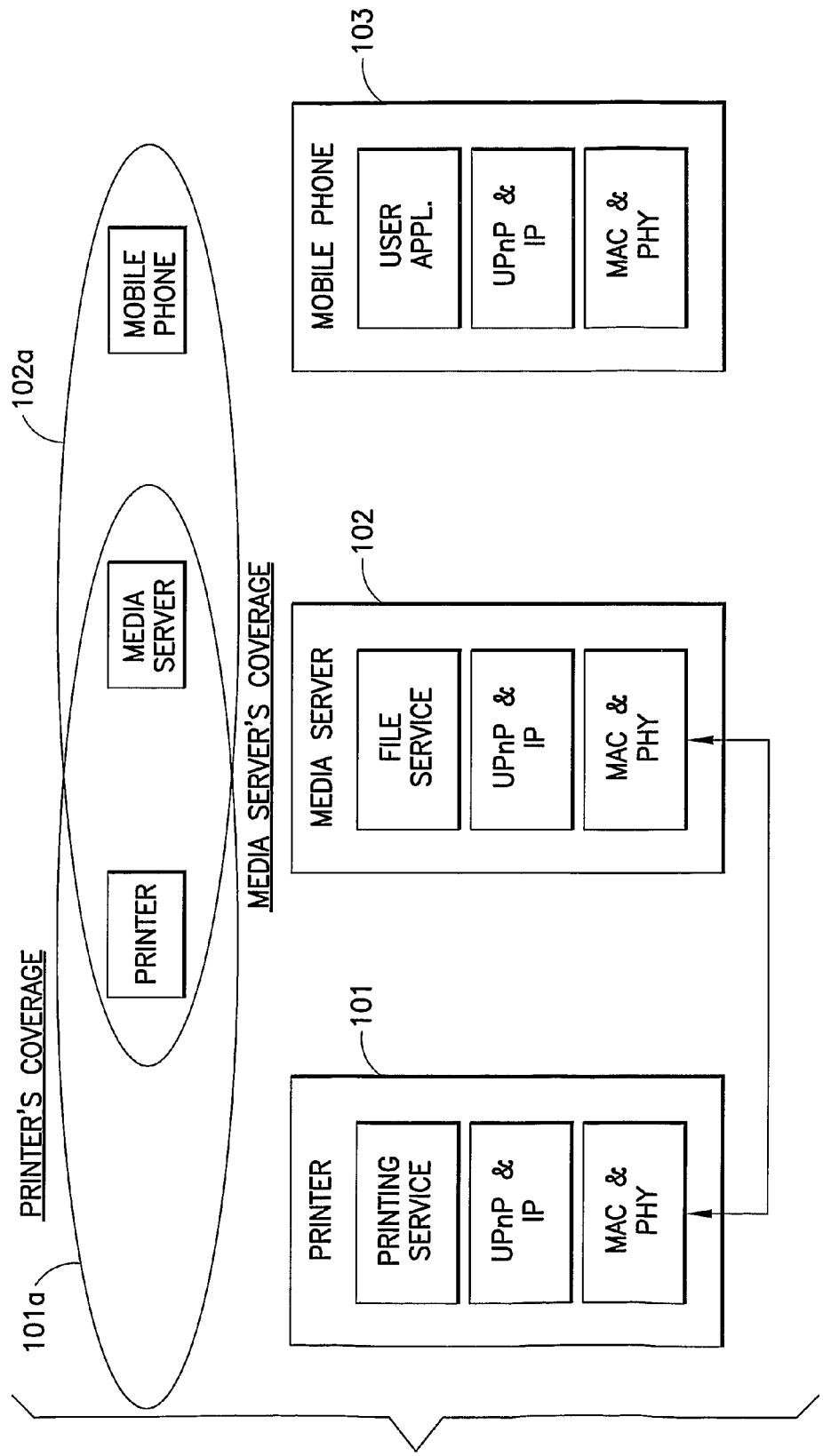
FIG. 1 illustrates for examples given a case in which a printer and media server operate in a same WLAN mesh network, and a mobile phone is WLAN mesh capable but not yet in the network.

For clarity of description, we use the following terminology to distinguish three different devices in the peer network: the device that is seeking to establish/create a peer link is termed the discovering apparatus, device, MP or STA, the device from which the discovering device receives the information (link metrics and/or location) is termed the reporting apparatus, device, MP or STA, and the device that is offering the services is termed the offering apparatus, device, MP or STA. Note that a MP in a mesh or ad-hoc network may also be an AP and as will be seen below the reporting apparatus, device, MP or STA and the offering apparatus, device, MP or STA may be the same entity in certain instances. Any of these devices may act as discovering, reporting, or offering devices at different times, and at certain times may take on two or all three of those functions simultaneously depending on what other devices are doing (discovering, offering, etc.).

The exemplary service discovery mechanisms presented herein include information provided by the WLAN MAC that contains at least device type, service type and device identifier. The service discovery should be in order to allow a user to properly discover what services are available. In the exemplary embodiments, the WLAN MAC layer provides enough detailed information about services available in the network, in a device or in an apparatus.

A device in a mesh network, termed a mesh point, uses L2 service discovery according to these teachings to get information of the offered services in another device or network without creating a peer link (or association) with the other device.

If the offered service is interesting, the MP may then select the best peer MP from which the MP can access to the service in the most effective way. The suitability of the MP in the current state of the art may be detected only after creating the peer link, which means that there may be unused or non-suitable links created when the MP creates multiple peer links in order to select the best one for its needs. Battery powered apparatuses, devices or MPs should avoid the creation and maintenance of the unnecessary links, because the maintenance of the peer link consumes always some power.

According to certain exemplary embodiments presented herein, there are new information elements to the L2 service discovery protocol that help an MP to select the best device to which the MP creates the peer link for the service. Some embodiments of this invention provide link metrics to the MP in the mesh network that offers that service(s), or the location of the MP in the mesh network that offers the service(s). both, and other embodiments provide one or the other of link metrics and MP location.

In general, the link metric information from the reporting device provides an estimation of the 'goodness' of the path to the offering MP that offers the service. The link metric information is present in the service discovery information, if the reporting device has a path to the offering device that offers the service. Three examples illustrate the concept:

If the reporting MP is actually offering the service in the mesh, the reporting device is the same as the offering device and so the path metric is set to zero (or some other value that indicates that the reporting and offering are from the same device).

If the reporting MP does not have a path to the offering MP in the mesh that offers the service (i.e. the previously valid path has expired), the reporting MP may set the path metric to a specific value or indicate otherwise that the path metric is not known.

If the service is actually beyond the mesh network (e.g., the offering device is available through the Internet but not directly within the mesh network), the metric is calculated to the portal which offers a route to the service (e.g., through the AP. In some embodiments further information in this regard may be made available to discovering devices, for example the presence of the service lying outside the mesh network may be indicated with some field or value of a field in the message which gives the discovering device its path metrics and/or location information.

The discovering device can then estimate the 'goodness' of its own link to the reporting MP, and add this link metric value to the path metric value. The discovering device can then use the combined result to detect which of various reporting devices offers the best path for the traffic transmitted for the service (i.e., traffic directed to the offering MP).

For the case where the device location information is provided in L2SD, the discovering device may determine in which direction it should move in order to be closer to the offering device that offers the service. The discovering device can determine this from its own location (which it knows) and also from the location of the offering device which it knows from the service discovery information provided by the reporting device.

Additionally, location information of the discovering device, that the discovering device makes available to others (e.g., when functioning as reporting device of its own location at least), provides to the offering device the location of the device for which that offering device will be providing its services.

If the service or offering device is actually beyond the mesh network itself (e.g. in the Internet), the location information specifies the location of the portal which offers route to the service. As above, information that the offering device lies outside the mesh network may also be provided.

In the following are two exemplary specific embodiments showing how the L2SD service discovery mechanism operates. First at FIG. 1 is shown a system layout which underlies those two examples at FIGS. 2 and 3. Within a WLAN network there is a printer 101, a media server 102, and a mobile phone 103. The printer 101 has coverage area 101*a* that extends to the media server 102 but not to the mobile phone 103. The media server 102 has a coverage area 102*a* that extends to both the mobile phone 103 and to the printer 101. The mobile phone 103 would like to use printing services, but is not yet in the network since it is unaware that there is a printer within it that offers the printing services the mobile phone needs. The mobile phone 103 does not see the printer's GAS or beacon directly because it lies outside the printer's coverage area 101*a*. In an exemplary embodiment the devices in the network may use UPnP over an established peer link, but the mobile phone 103 is not yet in the network.

Once the mobile phone 103 is in the WLAN, it will also use UPnP also upon configuring IP, but under the prior art the mobile phone 103 would join that WLAN without knowing in advance whether there was a device there which was offering the printing services it needs. Since it may have the option to join several different WLANs, it may join another WLAN first which does not have a device offering printing services and continue creating and tearing down peer links until it finds a WLAN that offers the services it needs.

Figure 2:
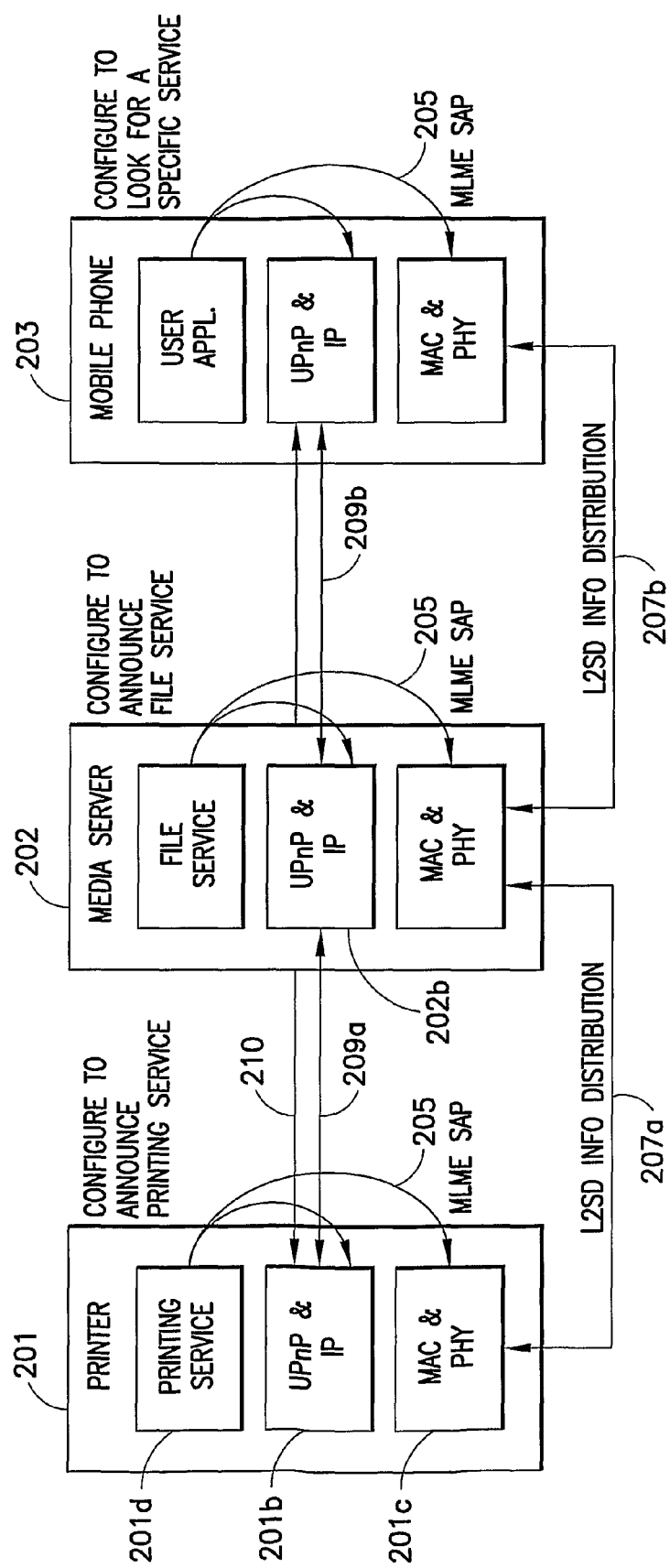
FIG. 2 illustrates a first exemplary embodiment of the service discovery whereas a printer and media server operate in a same WLAN mesh network, and a mobile phone is WLAN mesh capable but not yet in the network.

Now consider FIG. 2 which illustrates with particularity the service discovery according to an exemplary embodiment of these teachings and assuming three devices arranged as in FIG. 1 with the same extent of coverage areas 101*a*, 102*a*. Like FIG. 1, the printer 201 and the media server 202 operate in a same WLAN mesh network, and the mobile phone 103 is WLAN mesh capable but it is not yet in the network. All these devices may use for example UPnP. But according to these exemplary embodiments there is also a MLME SAP which is an interface to manage the WLAN MAC layer.

The printer 201 and the media server 202 use the UPnP protocol stack in the UPnP & IP layer 201*b*, 202*b* to advertise their services, and the UPnP is configured locally accordingly. With L2SD support, a similar configuration of the WLAN MAC may be needed in the MAC and/or PHY layer 201*c*, 202*c* of both the printer 201 and the media server 202. The MLME SAP 205 provides an interface for the configuration. While shown only for printing services 201*d* of the printer 201 and file services 202*d* of the media server, it is understood that each device 201, 202 is configured to provide over the MLME SAP interface 205 information about every service that the device makes itself available to perform for other network entities. UPnP would be used in the normal manner, and all the related messages are carried in data type frames.

Each of the printer 201 and the media server 202 would advertise both their own service and each other's service through L2SD. Such 'advertising' may be conducted via beacon frames (which are broadcast), GAS frames, unicast messages (which are not broadcast), or probe responses that are sent point-to-point and only in reply to a probe received from a discovering device, to name a few non-limiting embodiments. Term these generally discovery messages, understanding that they are made available to discovering devices which are not yet in the mesh network. This is shown in FIG. 2 as L2SD information distribution, which in an embodiment includes information selected from the set {device type, service type and device identifier} and also information selected from the set {path metric and device location}. The printer 201 and the media server 202 are within each other's coverage areas, so for example the location and path metrics that the media server 202 receives from the discovery message by the printer 201 at line 207*a* is copied by the media server 202 in the discovery message that it transmits at line 207*b*. The mobile phone 203 can hear that discovery message 207*b* from the media server 202 and see, without yet setting up a peer link with either the media server 202 or the printer 201, that there is a printer available in the WLAN and that there is a path to it through the media server 202. Similarly, the discovery message that the printer sends 207*a* carries the L2SD information that it received from the media server 202 from its discovery message.

The mobile phone 203 user wants to print a document, and finds out from the discovery message it receives at 207*b* from the media server 202 that in the wireless network there is printing service available. With that information available already in the scanning phase, the user of the mobile phone 203 can make an informed decision on joining the network.

Once joined into the network, the mobile phone 203 may then add the information about the media server 202 and the printer 201 to the discovery message that it transmits. Thus each device in the WLAN transmits a discovery message 207*a/b* with information about itself as well as information, which it received on any other devices with L2SD information in a discovery message 207*a/b*, about all other devices that are in the network. This is because in the mesh network the information in the discovery messages soon propagates through the entire network.

In order to keep the volume of information in any individual device's discovery message to a reasonable level, for the case where there are similar/identical services offered by different devices (e.g., the reporting device is also offering a printing service and another device offers printing services also), the reporting device in one embodiment sends on its own discovery message only the service to which the link metric is the strongest (e.g., shortest number of hops, which in the example would be its own printing service).

Once in the network the mobile phone 203 can communicate over the peer link 209b with the media server 202, which communicates over its own peer link 209a with the printer 201. The mobile phone 203 then sends its data for printing over peer links 209b which the media server relays to the printer 201 over peer link 209a. The mobile phone's document is thereby printed according to the printing services 201d announced by the printer 201 via the L2SD information that may be included in a discovery message 207a that was read by the media server 202 and repeated in the discovery message that it transmitted 207b which the mobile phone 203 heard.

With the printer's location information also in the L2SD information 207b that the media server sends, the user of the mobile phone 203 may instead choose to move closer to the printer 201 and enter the network by setting up a direct peer link 210 with the printer 201 rather than go through the media server 202. Or the user of the mobile phone 203 may choose to enter the network with a peer link to the media server 202 and thereafter move closer to the printer 201 for a direct peer link 210 prior to sending the print job. That would result that the number of hops would be reduced.

Figure 3:
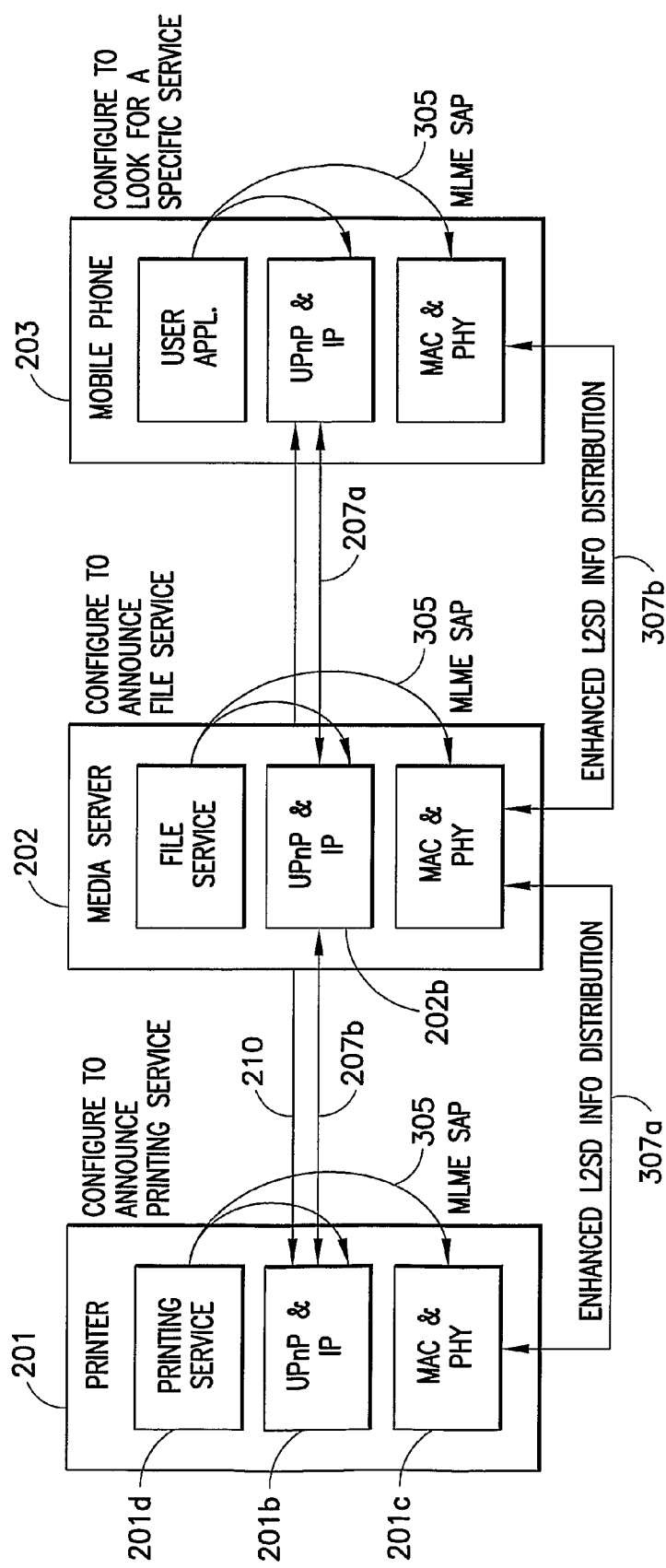
FIG. 3 illustrates a second exemplary embodiment of the service discovery whereas only link metric and location information available for every service description.

The exemplary embodiment presented at FIG. 3 illustrates a similar physical arrangement as in FIG. 2 but where link metric and location information is made available for every service description. Like reference numbers are similar to the FIG. 2 description above.

In this exemplary embodiment the WLAN MAC layer 201c needs to be provided location information through the MLME SAP 305 both in the printer 201 and in the media server 202. The information can come from anywhere in the device and need not to be from the service 201d itself. For example, coordinates from a global positioning system GPS unit can be used, or triangulated location information from adjacent base stations/fixed network nodes can be used in the case of the mobile phone, or location can be interpolated from relative signal strength indications of signals received from other transmitters/base stations, as three non-limiting examples.

The link metric information is provided to the L2SD descriptions 308a/b internally in the WLAN mesh MAC layer 201c. Each mesh point 201, 202, 203 needs to calculate link metrics for each L2SD service announcement from the neighbors (or peer mesh points or peer nodes). Further one needs to ensure that each service is announced only once.

For this each device monitors the L2SD information that it receives for example in discovery messages from other devices in the network, removes duplicates (e.g., where the discovery messages from two adjacent mesh points each announce the same printer service and location, or where a discovery message from an adjacent mesh point announces the device's own advertised services) to arrive at a set of unique information, and adds that unique information received on other peers discovery messages to its own L2SD discovery message.

For example a mobile phone 203 user wants to print a document and finds out that in the mesh network there is printing service 201d available. The mobile phone 203 now has further information about the service. From the link metric the mobile phone 203 knows how good the quality of the path to the offering device 201 is that can provide the service 201d. From this further information the mobile phone 203 can determine whether it is worthwhile to set up a link to try to use those advertised services. For example, if the path to the service is "too narrow" such as going through two interim devices and there is no alternate path to the offering device, then the mobile phone 203 may conclude that it is not worthwhile to join the network since either of those two interim peers dropping out of the network would make the printing service 102d unavailable to the mobile phone 203.

In an opposite scenario, if there are multiple devices 201 offering printing or other services that the mobile phone 203 wants, the mobile phone can use the link metrics to select between those different services/offering devices. This may affect the mobile phone's link creation because selection of one offering device over another according to their different link metrics will mean the mobile phone 203 sets up its peer link to a different peer so as to more directly link to the offering device it selects.

The location information may be also used when selecting the service, locating the device providing the service and creating the link to the service for reasons similar to those detailed above for link metrics.

The link metrics and/or location information for the L2 service descriptions may be added alongside of other service descriptors. In the exemplary WLAN case the service description information is expected to be presented in information elements (IE). The service description fields are then expected to be available in sub-elements either with fixed pre-determined format or with type-length-variable (TLV) encoding. Thus according to an embodiment of the invention there is sent a discovery message having an information element carrying information about at least one of link metrics and device location for the host device and also for other devices for which similar information was received in received discovery messages. The sending device updates the link metrics that it receives in those received discovery messages to account for its own influence on the link metrics.

Thus according to embodiments of the invention, routing and/or location information is made available to devices that have not yet established a peer link, from which the non-peer device can then decide to which candidate peer is should create a peer link (e.g., which candidate peer offers the best performance for the services/application that the non-peer seeks). This differs from conventional WLAN in which any routing information is available only after a peer link is established.

The existing L3 service discovery mechanisms UPnP and/or Zeroconf protocols are used to distribute the information of the availability of the services. In an embodiment, the L3 service discovery will operate for any application in the mesh network, alongside the L2SD according to these exemplary teachings.

The L2 support for service discovery according to these exemplary teachings enables neighbor devices to detect that service discovery is used in the network, and devices may request and send a response of the available service information for example via MAC level discovery messages ((e.g., beacon frames, GAS frames, probe.request and probe.response frames). It is understood that in WLAN currently, available services in the network are advertised to other MPs only if the information is carried on L3 frames, i.e. the available services in the WLAN network requires authentication since they are only sent over a peer link. According to these exemplary teachings the L2SD may be used to get information of the services operating in the network, and since it is L2 there is no authentication required to get that link metric and location information.

When an MP has performed L2 service discovery and found that the network has a service the MP is interested in using, the MP may continue to request L2 service discovery information from other MPs to detect to which MP it should create a peer link. The discovering MP may store the service request information from L2 in its local memory, depending on its implementation specific logic. From these stored L2 information sets the discovering MP can then decide with which MP it should establish a peer link in order to best access those services it wants to access.

One technical advantage for having such information available in layer 2 in WLAN may be power and time saving in a client device during its network selection phase. The savings arise for the case where the client device detects multiple WLAN networks when scanning. The L2SD enables the client device to select the proper one to join. The user is, however, looking for a specific service (e.g. printer) and is less concerned about which specific network it may join, only that it can access those services it seeks. It is possible with the L2SD mechanism the client device would not need to join every possible network, run service discovery on top of IP (UPnP or Zerocont) per network to find out whether the service it seeks is available in that network, and if not move to the next network.

Exemplary embodiments of these teachings may use the GAS concept as the mechanism to deliver the service information, or it may be delivered directly via discovery messages and probe responses. In one particular embodiment, beacon frames are used to distribute the information among MPs within the network and GAS or probe/response exchanges are used to distribute the L2SD information to discovering devices that are not yet in the network. In another particular embodiment a device receives from other nodes in the mesh is re-transmitted in that device's own discovery message so that the information about the entire network may be distributed across the entire network, regardless of multi-hops and coverage areas of individual devices.

Figure 4:
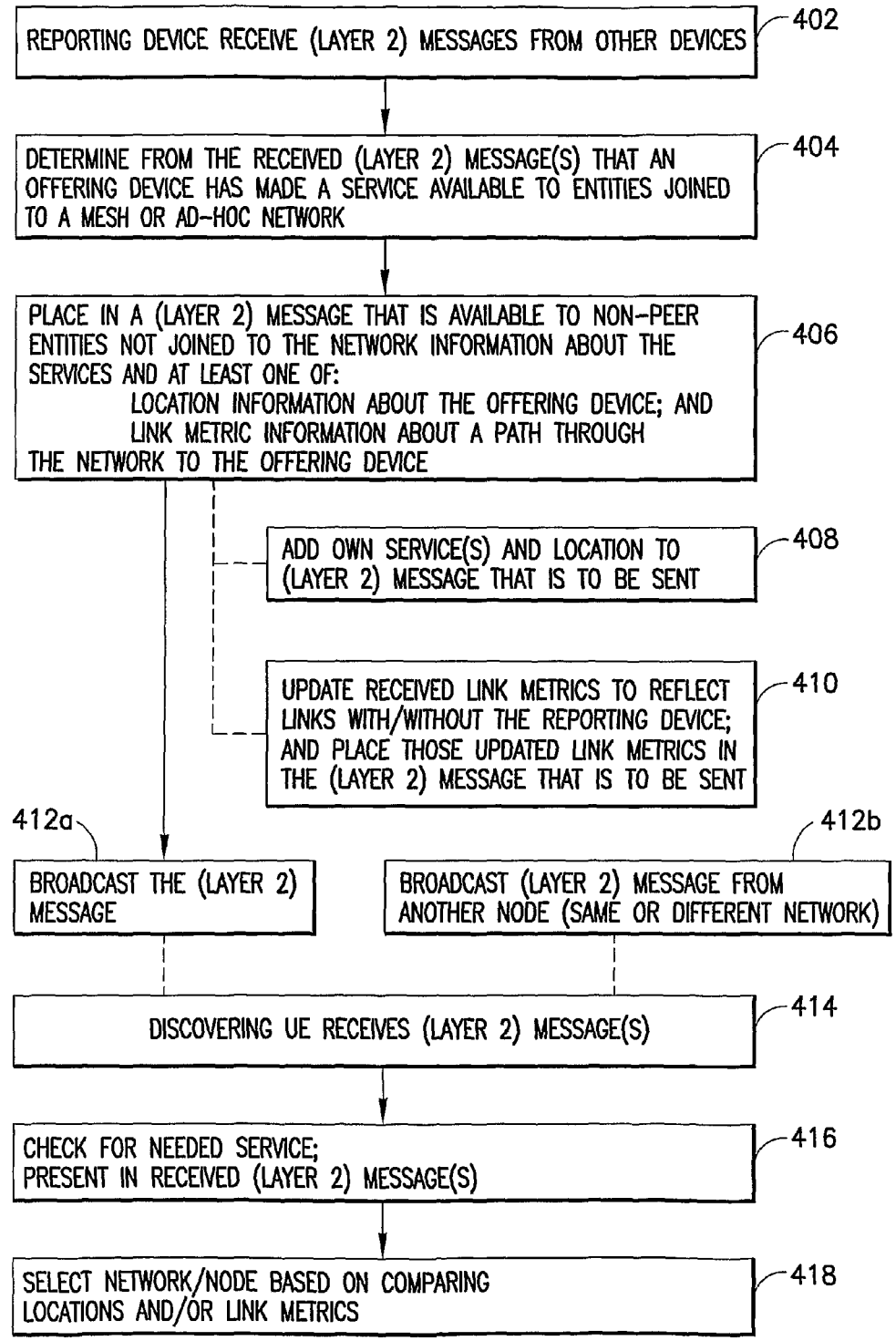
FIG. 4 is a logic flow diagram that illustrates the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. This is true from the perspective of both the reporting device and for the discovering device. Since the offering device is also a reporting device, FIG. 4 addresses that implementation also. In accordance with these exemplary embodiments at block 402 the reporting device receives L2 messages (discovery message) from other devices such as the offering device. This information is received from other peers though, and need not be received by the reporting device over an L2 message. At block 404 the reporting device determines from the received L2 message(s) that an offering device has made a service available to entities joined to a mesh or ad-hoc network. At block 406 the reporting device places in a layer 2 message, which message is to be made available to non-peer entities not joined to the network, information about the services and either or both of location information about the offering device, and link metric information about a path through the network to the offering device.

As can be seen at block 408 for the case that the reporting device also is an offering device, it adds its own service(s) and its own location to the L2 message that is to be sent. It may determine its own location as above (GPS, triangulation, signal strength), and it determines the location of other offering devices from messages it receives either from those devices directly or from other interim devices through which the path through the network to that offering device runs.

The link metrics which the reporting device may receive from other devices (e.g., at block 402) may be updated by the reporting device to account for its own influence on those link metrics (e.g., add a hop, delete a hop, depending on the path which runs to the offering device). It may be those updated path metrics that are put at block 410 into the L2 message the reporting device is to send, it may not be the copied link metrics it receives (except for the case that the reporting device has no influence on a particular link metric). As above, repeated information is deleted so that if there is location and service information about the same service and offering device received in two distinct L2 messages, that information may be repeated only once in the L2 message the reporting device broadcasts at block 412a.

It is noted that in one particular embodiment the reporting device may only report about itself as offering device, and not propagate all the information about other services available in the network by other offering devices. For example, while a combined reporting/offering device may receive L2 messages from other reporting devices at block 402, such a combined reporting/offering device in this embodiment does not put that received information into its own L2 messages that it sends out. In this case, at block 404, determining that an offering device has made a service available to entities joined to a wireless network is simply the subject combined reporting/offering device determining that it will make its own service available. This combined reporting/offering device then places in a layer 2 message, that is available to non-peer entities not joined to the wireless network, information about the services that it is offering and at least one of: location information about the offering apparatus (which is itself); and link metric information about a path through the wireless network to itself.

Now at block 414 the discovering device receives the L2 message from block 412a and sees that the services it is interested in accessing are available on that network, and the location/link metric to the offering device offering those services. The same discovering device may also receive another L2 message sent at block 412b from another reporting device, which may be on the same or a different mesh network than the one sending at block 412a. At block 416 the discovering device sees that the services it seeks are available through both reporting devices/nodes, and so at block 418 the discovering node selects one of those reporting nodes with which to create a peer link based on comparing locations and/or link metrics from the different 412a/b L2 messages it received. If the nodes are in different networks this is a selection of mesh networks; if they are on the same network this is a selection of nodes from within the network that will give the best path/location relative to the offering device that will be delivering the service to the discovering device.

The various blocks shown in FIG. 4 may be viewed as method steps, and/or as operations that result from operation of computer program code, and/or as a plurality of coupled logic circuit elements constructed to carry out the associated function(s). Further the presented function(s) in FIG. 4 may be executed in some embodiments only partly in different nodes, devices and/or apparatuses.

Figure 5:
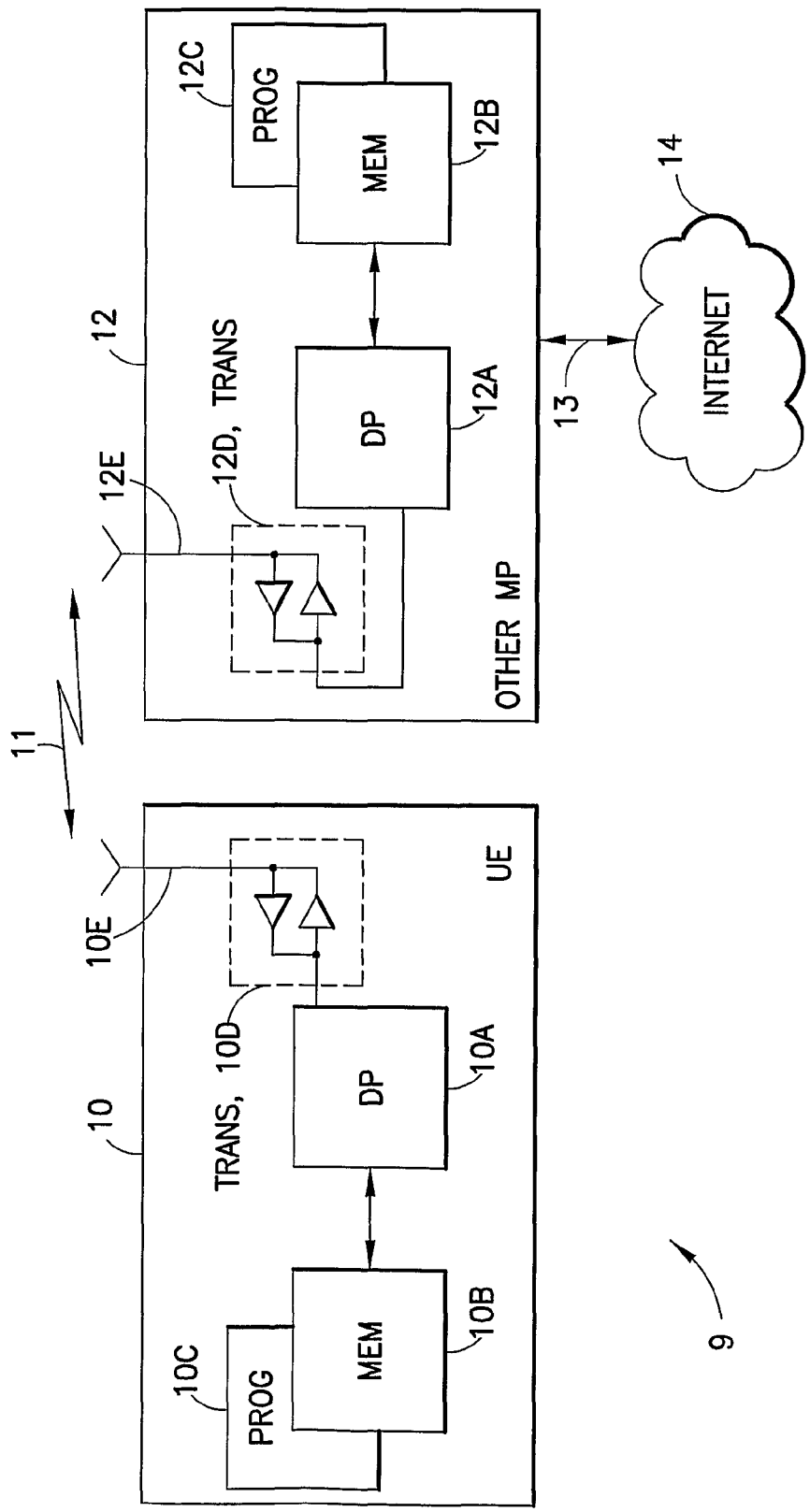
FIG. 5 shows a simplified block diagram of various electronic devices that are suitable for use in practicing the exemplary embodiments of this invention.

Now is described FIG. 5 which illustrates a simplified block diagram of various electronic devices and apparatus that are suitable for use in practicing the exemplary embodiments of this invention. In FIG. 5 a wireless communication network (like mesh or ad-hoc) is adapted for communication over a wireless link 11 between an apparatus, such as a mobile communication device which may be referred to as a UE 10, and another device as MP 12 which may also be a UE itself. The other MP 12 may include a gateway functionality shown in FIG. 5 which provides connectivity with a broader network 14 such as the internet or some other data communications network, but the fact that the network 9 is ad-hoc or mesh means that the UE 10 need to have a direct link with such a gateway but may be linked only via multi-hops. In that case, prior to entering the network 9 the discovering UE 10 may be unaware from the prior art that there may be a gateway functionality in the network 9. The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the other MP 12 via one or more antennas 10E. The other MP 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas 12E. The other MP 12, when acting as access point for the mesh network 9, is coupled via a data path 13 to the broader network 14. The UE 10 and the other MP 12 may also be coupled to other elements of the system 9 such as further MPs to which they are linked view direct single-hops or only via multi-hops.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the other MP 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 6:
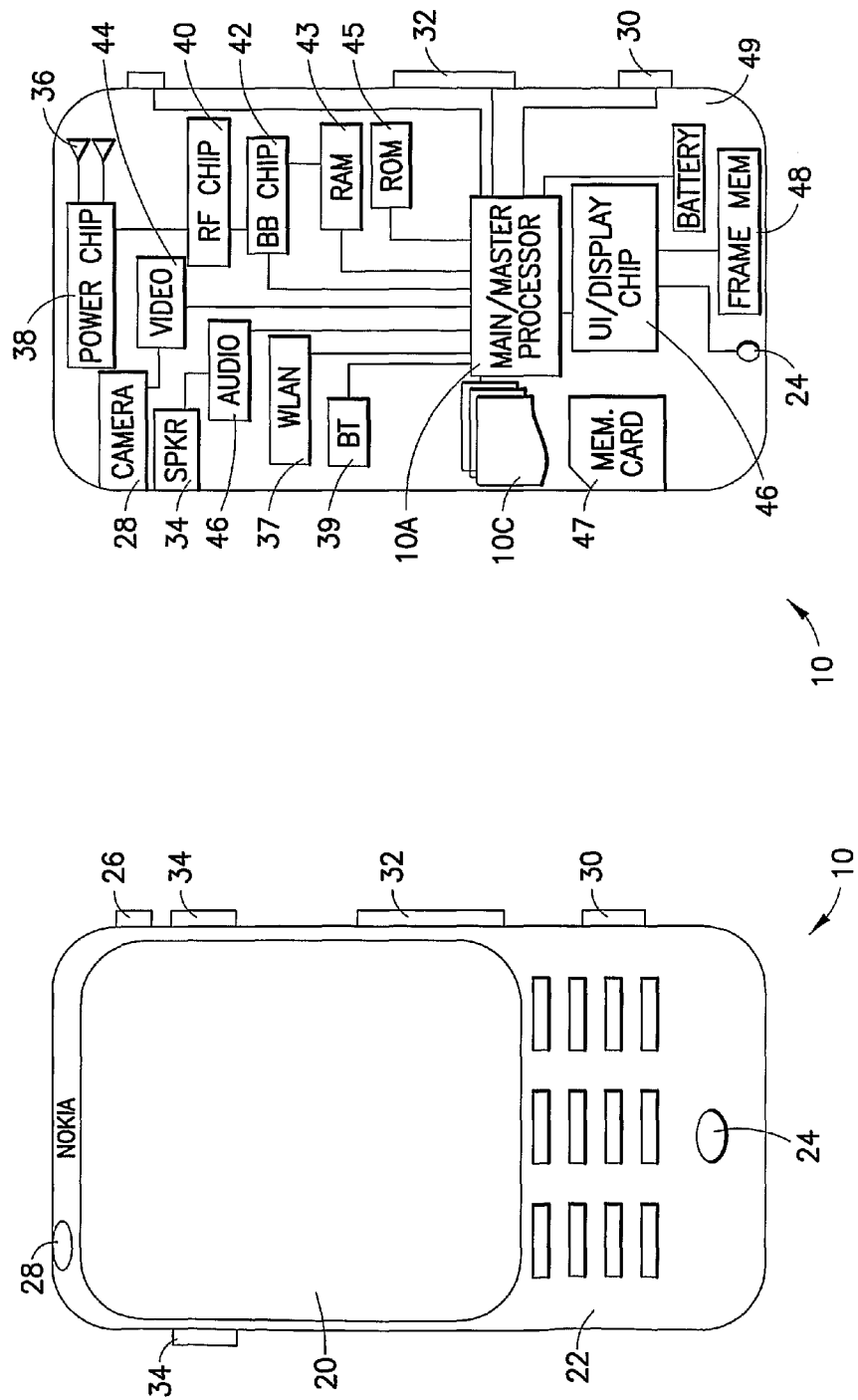
FIG. 6 shows an exemplary more particularized block diagram of a user equipment such as that shown at FIG. 5.

FIG. 6 illustrates further details of an exemplary UE in both plan view (left) and sectional view (right), and the invention may be embodied in one or some combination of those more function-specific components. At FIG. 6 the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 6 are seen multiple transmit/receive antennas 36 that may be used for cellular communication. The antennas 36 may be multi-band for use with other radios in the UE. The power chip 38 controls power amplification and outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more further radios such as a wireless local area network radio WLAN 37 which may be of interest to these teachings, and a Bluetooth® radio 39. Either or both of these radios may incorporate an antenna on-chip or be coupled to an off-chip antenna. Throughout the apparatus are various memories such as random access memory RAM 43, read only memory ROM 45 (and in some embodiments removable memory such as the illustrated memory card 47) on which the various programs 10C are stored. All of these components within the UE 10 are normally powered by a portable power supply such as a battery 49.

The aforesaid processors 38, 40, 42, 44, 46, 50, if embodied as separate entities in a UE 10 may operate in a slave relationship to the main processor 10A, which may then be in a master relationship to them. The exemplary embodiments of this invention may be relevant to the WLAN chip 37, and in some embodiments the functionality added by these teachings is implemented in the main processor 10A. For an example of the latter, these teachings may in some cases be implemented within WLAN MAC management that uses the WLAN SAP, which is sometimes located in the main processor 10A. Different specific device architectures may make different functional splits among the BB chip 42, the WLAN chip 37, and the main processor 10A, or may impose all the relevant functionality to implement these teachings in only one of them. It is noted that other embodiments need not be disposed there but may be disposed across various chips and memories as shown or disposed within another processor that combines some of the functions described above for FIG. 6. Any or all of these various processors of FIG. 6 access one or more of the various memories, which may be on-chip with the processor(s) or separate there from. Similar function-specific components that are directed toward communications over a mesh or ad-hoc network (e.g., components 36, 38, 40, 42-45 and 47) may also be disposed in exemplary embodiments of the other MP 12, which may have one or more antennas not necessarily the same number as shown for the UE 10.

Note that the various chips (e.g., 38, 40, 42, etc.) that were described above may be combined into a fewer number than described and, in a most compact case, may all be embodied physically within a single chip.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of a mesh WLAN system, it should be appreciated that the exemplary embodiments of this invention are not limited for use with only this one particular type of wireless communication system, and that they may be used to advantage in any other mesh or ad-hoc wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g. beacon frame, probe response, etc.) are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving, by a reporting apparatus, a first service discovery message indicating that an offering apparatus has made a service available only to peer entities joined to a wireless network; and
   in response to receiving the first message, transmitting, by the reporting apparatus, in a second service discovery message that is available to non-peer entities not joined to the wireless network, information about the services available from the offering apparatus and at least one of:
      location information about the offering apparatus; and
      link metric information about a path through the wireless network to the offering apparatus;
      wherein the second discovery message includes an information element carrying the location information and the link metric information includes the number of hops from the reporting apparatus to the offering apparatus;
   wherein the information about the services in the message comprises information selected from a set {device type, service type and device identifier}, where device type and device identifier are for the offering apparatus and service type is for the available service; and
   wherein the message comprises:
      the location information about the offering apparatus;
      the link metric information about the path through the wireless network to the offering apparatus; and
      information about the reporting apparatus, the information selected from the set {device type and device identifier} for the reporting apparatus and,
      for the case where the apparatus also makes an additional service available to entities joined to the wireless network, the message further comprises service type for the additional service offered by the offering apparatus.

2. A method according claim 1, wherein determining that an offering apparatus has made a service available is from a received message.

3. A method according to claim 2, further comprising a probe request and receiving in response to the sent probe request a probe response that comprises the received message.

4. A method according to claim 2, wherein the received message further comprises the location information about the offering apparatus.

5. A method according to claim 2, wherein the message is received from an interim apparatus through which passes the path through the wireless network to the offering apparatus.

6. A method according to claim 1, wherein the message comprises:
   information about each service made available to entities joined to the wireless network by each offering apparatus that is within the wireless network;
   and at least one of:

location information about each of the offering apparatuses; and link metric information about at least one path through the wireless network to each of the offering apparatuses.

7. The method according to claim 6, executed by the reporting apparatus that is configured to send the message, the method further comprising:

receiving, by the reporting apparatus, at least one message that carries initial link metric information about at least one path through the wireless network to each of the offering apparatuses; and updating, by the reporting apparatus, each of the initial link metric information to account for an added multi-hop through the apparatus or a reduced multi-hop due to presence of the apparatus in the at least one path;

wherein the link metric information that is placed in the message is the updated link metric information.

8. A method according to claim 1 in which the wireless network comprises a mesh or ad-hoc wireless local area network.

9. A memory storing a program of computer-readable instructions executable by a processor to perform actions comprising:

receiving, by a reporting apparatus, a first service discovery message indicating that an offering apparatus has made a service available only to peer entities joined to a wireless network; and in response to receiving the first message, transmitting, by the reporting apparatus, in a second service discovery message that is available to non-peer entities not joined to the wireless network, information about the services available from the offering apparatus and at least one of:

location information about the offering apparatus; and link metric information about a path through the wireless network to the offering apparatus;

wherein the second discovery message includes an information element carrying the location information and the link metric information includes the number of hops from the reporting apparatus to the offering apparatus;

wherein the information about the services in the message comprises information selected from a set {device type, service type and device identifier}, where device type and device identifier are for the offering apparatus and service type is for the available service; and wherein the message comprises:

the location information about the offering apparatus;

the link metric information about the path through the wireless network to the offering apparatus; and information about the reporting apparatus, the information selected from the set {device type and device identifier} for the reporting apparatus and for the case where the apparatus also makes an additional service available to entities joined to the wireless network, the message further comprises service type for the additional service offered by the offering apparatus.

10. A memory according to claim 9, wherein determining that an offering apparatus has made a service available is from a message received from the offering apparatus.

11. A reporting apparatus comprising:

a processor configured to receive a first service discovery message indicating that an offering apparatus has made a service available only to peer entities joined to a wireless network; and a management entity configured to, in response to receiving the first service discovery message, transmitting in a second service discovery message that is available to non-peer entities not joined to the wireless network, information about the services available from the offering apparatus and at least one of:

location information about the offering apparatus; and link metric information about a path through the wireless network to the offering apparatus;

wherein the second discovery message includes an information element carrying the location information and the link metric information includes the number of hops from the reporting apparatus to the offering apparatus;

wherein the information about the services in the message comprises information selected from a set {device type, service type and device identifier}, where device type and device identifier are for the offering apparatus and service type is for the available service; and wherein the message comprises:

the location information about the offering apparatus;

the link metric information about the path through the wireless network to the offering apparatus; and information about the reporting apparatus, the information selected from the set {device type and device identifier} for the reporting apparatus and, for the case where the apparatus also makes an additional service available to entities joined to the wireless network, the message further comprises service type for the additional service offered by the offering apparatus.

12. An apparatus according to claim 11, wherein the processor is configured to determine that the offering apparatus has made the service available from a message received at a receiver of the apparatus.

13. The apparatus according to claim 12, further comprising a transmitter configured to send a probe request, and wherein the receiver is configured to receive a probe response which comprises the received message in response to the sent probe request.

14. An apparatus according to claim 12, wherein the received message further comprises the location information about the offering apparatus.

15. An apparatus according to claim 12, wherein the message is received from an interim apparatus through which passes the path through the wireless network to the offering apparatus.

16. An apparatus according to claim 11, wherein the message comprises:

information about each service made available to entities joined to the wireless network by each offering apparatus that is within the wireless network;

and at least one of:

location information about each of the offering apparatuses; and link metric information about at least one path through the wireless network to each of the offering apparatuses.

17. An apparatus according to claim 16, wherein the apparatus comprises an apparatus which further comprises:

a transmitter configured to send the message;

a receiver configured to receive at least one message that carries initial link metric information about at least one path through the wireless network to each of the offering apparatuses; and the processor configured to update each of the initial link metric information to account for an added multi-hop through the apparatus or a reduced multi-hop due to presence of the apparatus in the at least one path;

wherein the management entity is configured to place in the message the updated link metric information.

18. An apparatus according to claim 11 in which the wireless network comprises a mesh or ad-hoc wireless local area network.

\* \* \* \* \*